United States Patent
Yamada et al.

(10) Patent No.: US 10,283,237 B1
(45) Date of Patent: May 7, 2019

(54) WATER CUT-OFF STRUCTURE

(71) Applicant: Yazaki Corporation, Tokyo (JP)

(72) Inventors: Tetsuo Yamada, Shizuoka (JP);
Hideomi Adachi, Shizuoka (JP);
Takeshi Ogue, Shizuoka (JP);
Masahide Tsuru, Shizuoka (JP);
Hiroyuki Yoshida, Shizuoka (JP);
Kenta Yanazawa, Shizuoka (JP);
Toshihiro Nagashima, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/161,302

(22) Filed: Oct. 16, 2018

(30) Foreign Application Priority Data

Oct. 18, 2017 (JP) .................................. 2017-201518

(51) Int. Cl.
H01B 7/282 (2006.01)
H01B 17/58 (2006.01)
H01R 13/52 (2006.01)

(52) U.S. Cl.
CPC ......... *H01B 7/2825* (2013.01); *H01B 17/583* (2013.01); *H01R 13/5216* (2013.01)

(58) Field of Classification Search
CPC ... H01B 7/2825; H01B 7/583; H01R 13/5216
USPC ...................................................... 174/110 R
See application file for complete search history.

(56) References Cited

U.S. PATENT DOCUMENTS

| 2016/0126709 A1* | 5/2016 | Maeda | H02G 3/0462 |
| | | | 174/68.3 |
| 2017/0229855 A1* | 8/2017 | Nakai | H02G 3/0691 |

FOREIGN PATENT DOCUMENTS

JP 2016-025750 A 2/2016

OTHER PUBLICATIONS

Deep-Sea Cable-Gland System for Underwater Vehicles; K. R. Haigh, PROC. IEE, vol. 115, No. 1, Jan. 1968.*

* cited by examiner

*Primary Examiner* — Timothy J Thompson
*Assistant Examiner* — Charles Pizzuto
(74) *Attorney, Agent, or Firm* — Sughrue Mion, PLLC

(57) ABSTRACT

In a water cut-off structure including: a shield electric wire having a braid covering signal lines; an exterior member through which the shield electric wire is inserted; and a grommet that is arranged at an opening of an attachment member, partitions one side and the other side of the attachment member, and has an insertion portion through which the shield electric wire is inserted, an exposed portion where the braid is exposed to the outside is arranged between the insertion portion and the exterior member and is provided with resin that is formed integrally with the exterior member and the insertion portion and is poured into a space between the signal lines in the braid, a space between the braid and the signal lines, a space in the braid, a space between the braid and the exterior member, and a space between the braid and the insertion portion.

2 Claims, 2 Drawing Sheets

WATER CUT-OFF STRUCTURE

CROSS REFERENCE TO RELATED APPLICATIONS

The present application claims priority to Japanese Patent Application No. 2017-201518 filed on Oct. 18, 2017, the entire contents of which are incorporated by reference herein.

BACKGROUND

Technical Field

The present invention relates to a water cut-off structure. More specifically, the present invention relates to a water cut-off structure between an exterior member through which a shield electric wire is inserted, and a grommet through which a shield electric wire is inserted.

Related Art

Conventionally, there is a known water cut-off structure provided with: a plurality of electric wires; an exterior member through which the electric wires are inserted; and a grommet, which is arranged at an opening of a panel functioning as an attachment member, partitions one side and the other side of the panel from each other, and is formed integrally with an outer circumference of the exterior member (see, for example, JP 2016-25750 A).

In such a water cut-off structure, a small diameter portion having an outer diameter smaller than other portions is provided in a part of the exterior member in a longitudinal direction, and a resin material constituting the grommet is integrally molded at the small diameter portion.

SUMMARY

In a water cut-off structure such as the structure disclosed in JP 2016-25750 A, the inside of an exterior member through which a grommet is inserted is not water-tight, and there is a possibility that water or the like enters into the inside of an attachment member along electric wires inserted through the inside of the exterior member.

Therefore, an object of the present invention is to provide a water cut-off structure capable of improving water cut-off performance.

An aspect of the present invention is a water cut-off structure having: a shield electric wire having a braid covering a plurality of signal lines; an exterior member through which the shield electric wire is inserted; a grommet that is arranged at an opening of an attachment member, partitions one side and the other side of the attachment member from each other, and has an insertion portion through which the shield electric wire is inserted; an exposed portion, which is arranged between the insertion portion and the exterior member and where the braid is exposed to the outside; and resin that is provided at the exposed portion, is formed integrally with the exterior member and the insertion portion, and is poured to a space between the plurality of signal lines in the braid, a space between the braid and the plurality of signal lines, a space in the braid, a space between the braid and the exterior member, and a space between the braid and the insertion portion.

The exterior member may be arranged on each of the one side and the other side of the attachment member. The exposed portion may be arranged between the insertion portion and each of the exterior member on the one side and the exterior member on the other side. The resin may be provided at each of the exposed portion on the one side and the exposed portion on the other side.

With the present invention, it is possible to provide a water cut-off structure capable of improving water cut-off performance.

DETAILED DESCRIPTION

Figure 1:
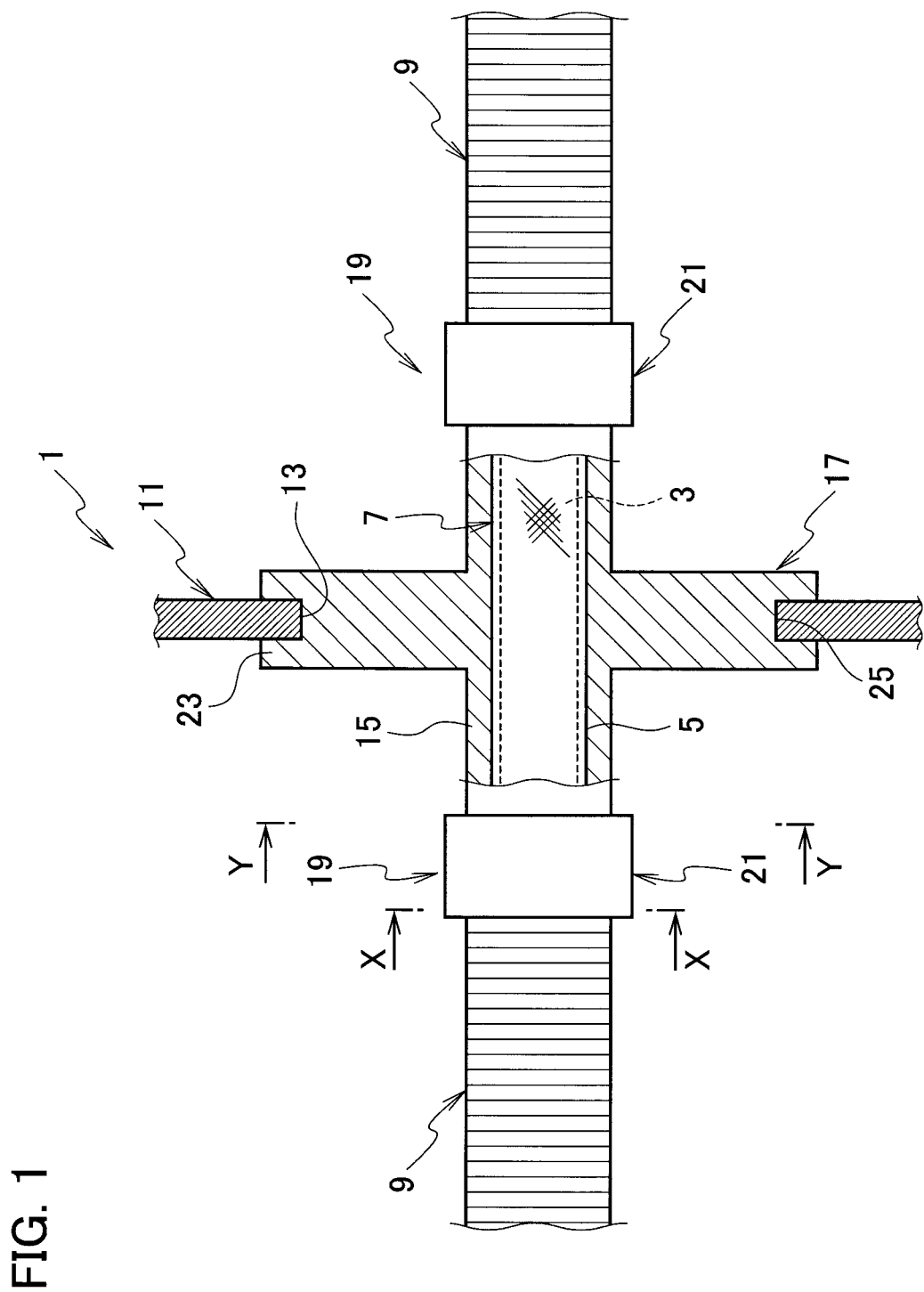
FIG. 1 is a side view illustrating a part of a water cut-off structure according to an embodiment of the present invention as a cross section.

A water cut-off structure according to an embodiment of the present invention will be described with reference to FIGS. 1 to 3.

A water cut-off structure 1 according to this embodiment is provided with: a shield electric wire 7 having a braid 5 covering a plurality of signal lines 3; an exterior member 9 through which the shield electric wire 7 is inserted; and a grommet 17 that is arranged at an opening 13 of an attachment member 11, sections one side and the other side of the attachment member 11 from each other, and has an insertion portion 15 through which the shield electric wire 7 is inserted.

Moreover, an exposed portion 19 where the braid 5 is exposed to the outside is arranged between the insertion portion 15 and the exterior member 9.

In addition, the exposed portion 19 is provided with resin 21 that is formed integrally with the exterior member 9 and the insertion portion 15 and is poured into a space between the plurality of signal lines 3 in the braid 5, a space between the braid 5 and the plurality of signal lines 3, a space in the braid 5, a space between the braid 5 and the exterior member 9, and a space between the braid 5 and the insertion portion 15.

Moreover, the exterior member 9 is arranged on each of the one side and the other side of the attachment member 11, and the exposed portions 19, 19 are arranged respectively between the insertion portion 15 and the exterior members 9, 9 on the one side and the other side.

In addition, resin 21, 21 is provided respectively at the exposed portions 19, 19 on the one side and the other side.

Figure 2:
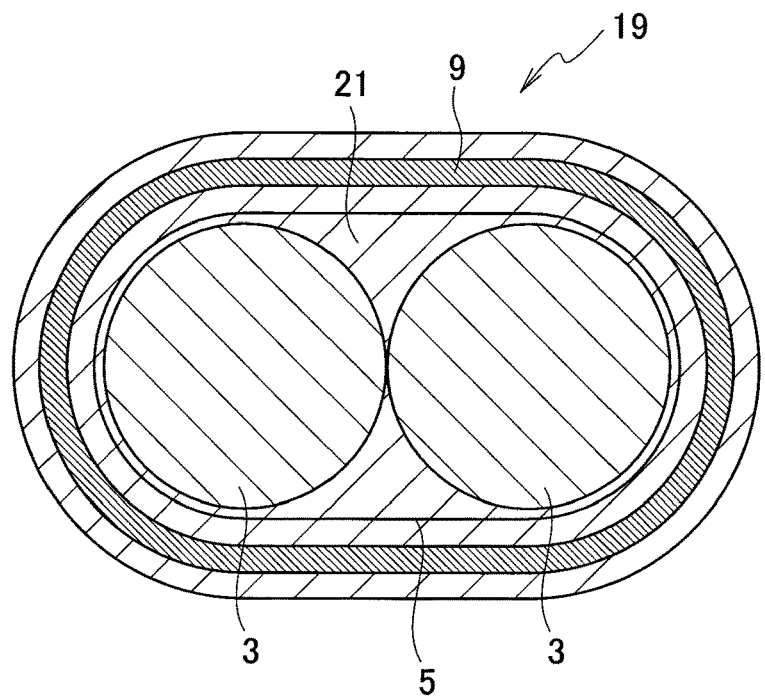
FIG. 2 is a sectional view taken along line X-X of FIG. 1.
Figure 3:
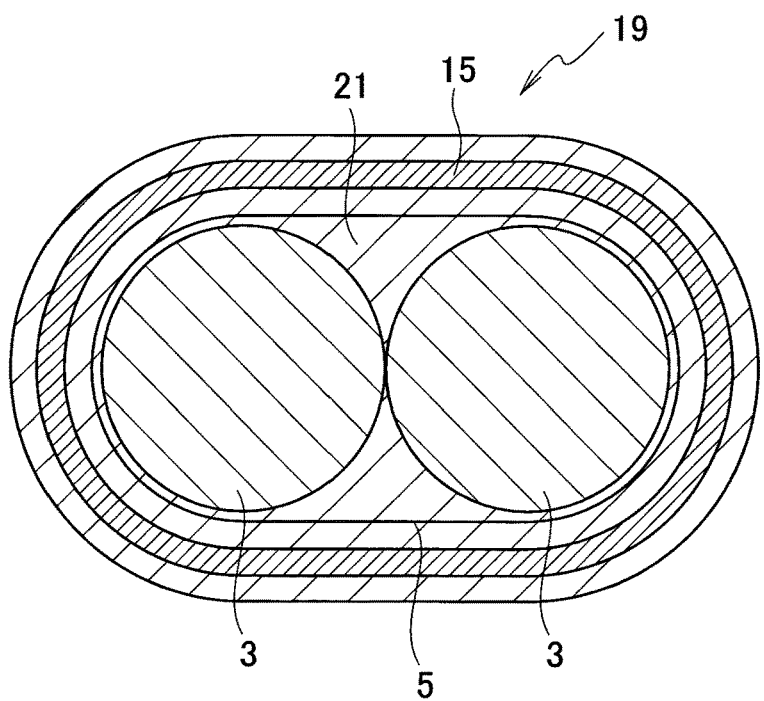
FIG. 3 is a sectional view taken along line Y-Y of FIG. 1.

As illustrated in FIGS. 1 to 3, the shield electric wire 7 is provided with a plurality of (two in this case) signal lines 3 and a braid 5.

The plurality of signal lines 3 are arranged between apparatuses (not illustrated) or between an apparatus and a power source (not illustrated), and both end sides of the signal lines are respectively connected electrically with an apparatus, a power source, or the like.

An outer circumference of the plurality of signal lines 3 is covered with the braid 5.

The braid 5 is formed by weaving a plurality of thin electrically conductive materials and covers the outer circumference of the plurality of signal lines 3, and one end of the braid 5 is grounded via a vehicle body (not illustrated) to form a shield circuit.

By covering the outer circumference of the plurality of signal lines 3 with such a braid 5, it is possible to prevent entering of noise or the like into the signal lines 3, or occurrence of noise or the like from the signal lines 3.

Such a shield electric wire 7 is inserted through the inside of the exterior member 9, and the outer circumference of the shield electric wire 7 is protected by the exterior member 9.

The exterior member 9 includes an insulating material such as synthetic resin, is formed in a cylindrical shape such that the plurality of signal lines 3 can be inserted through the inside of the exterior member 9, and is constituted of a protective member such as a corrugate tube that prevents the signal lines 3 from interfering with peripheral members.

The shield electric wire 7 with the outer circumference covered with the exterior member 9 is inserted through the opening 13 of the attachment member 11 and is arranged on one side and the other side of the attachment member 11.

The attachment member 11 has, for example, a wall portion such as a panel that partitions a cabin as one side and the outside of a cabin as the other side from each other, and the wall portion is provided with the opening 13 through which the shield electric wire 7 is inserted.

The grommet 17 functioning as a seal member for partitioning one side and the other side from each other is arranged at the opening 13 of the attachment member 11.

The grommet 17 includes an elastic material such as rubber and is provided with a close contact portion 23 and the insertion portion 15.

The close contact portion 23 is formed in a flange shape and is provided with a groove portion 25 which can be engaged with an edge portion of the opening 13 of the attachment member 11 over the outer circumference in a circumferential direction.

The groove portion 25 of the close contact portion 23 is engaged in close contact with the edge portion of the opening 13, so as to prevent water or the like from entering through the opening 13 of the attachment member 11.

The insertion portion 15 is formed of a member continuous with the close contact portion 23 and is extended in a cylindrical shape toward one side and the other side of the attachment member 11 such that the shield electric wire 7 can be inserted through a center portion of the grommet 17.

In the state where the shield electric wire 7 is inserted, an inner circumferential surface of the insertion portion 15 is arranged in close contact with the outer circumference of the shield electric wire 7, so as to prevent water or the like from entering from one side to the other side, or from the other side to one side of the attachment member 11 along the shield electric wire 7.

However, since the braid 5 is arranged on the outer circumference of the shield electric wire 7, even if the inner circumferential surface of the insertion portion 15 is in close contact with the braid 5, a gap is formed by stitches of the braid 5, and it is difficult to inhibit entering of water or the like only with close contact by the insertion portion 15.

Therefore, the exterior members 9, 9 are arranged respectively on one side and the other side of the attachment member 11 in a longitudinal direction of the shield electric wire 7, and exposed portions 19, 19 where the braid 5 of the shield electric wire 7 is exposed to the outside are provided respectively between the exterior members 9, 9 and the insertion portion 15.

In the exposed portions 19, 19, resin 21, 21 is each integrally molded over a part of the exterior member 9 and a part of the insertion portion 15.

By molding the resin 21, 21 at the exposed portions 19, 19, molten resin flows respectively into a space between the plurality of signal lines 3 in the braid 5, a space between the braid 5 and the plurality of signal lines 3, a space in the braid 5, a space between the braid 5 and the exterior member 9, and a space between the braid 5 and the insertion portion 15, and is solidified in a state where all gaps are filled.

Therefore, even if water or the like enters into the exterior members 9, 9 on one side and the other side along the shield electric wire 7, the resin 21, 21 located at the exposed portions 19, 19 can reliably prevent further entering of the water or the like, and therefore the water or the like does not reach the insertion portion 15.

It is to be noted that any resin may be employed as the resin 21 as long as the resin solidifies and retains the shape after being melted.

Since any resin can be employed as the resin 21 as long as the resin can be molded at the exposed portion 19, it is possible to apply the resin to a general exterior member 9 or a general grommet 17 without using a dedicated exterior member or a dedicated grommet having a special shape, and therefore versatility can be improved.

In such a water cut-off structure 1, the exposed portion 19 is provided with resin 21, which is formed integrally with the exterior member 9 and the insertion portion 15 and is poured into a space between the plurality of signal lines 3 in the braid 5, a space between the braid 5 and the plurality of signal lines 3, a space in the braid 5, a space between the braid 5 and the exterior member 9, and a space between the braid 5 and the insertion portion 15, and therefore the resin 21 can inhibit water of the like from entering into the inside of the attachment member 11 along the shield electric wire 7 inside the exterior member 9.

Accordingly, with such a water cut-off structure 1 in which all gaps of the exposed portion 19 are filled with the resin 21, it is possible to reliably prevent entering of water or the like, and it is possible to improve water cut-off performance.

Moreover, since the resin 21, 21 is provided respectively at the exposed portions 19, 19 on one side and the other side, it is possible to prevent water or the like from entering from either the one side or the other side of the attachment member 11, and it is possible to further improve the water cut-off performance.

Although exposed portions are provided respectively on one side and the other side of an attachment member and resin is provided at each exposed portion in a water cut-off structure according to an embodiment of the present invention, the present invention is not limited to this. An exposed portion may be provided only on one side having a high possibility that water or the like enters, and resin may be provided at the exposed portion.

What is claimed is:

1. A water cut-off structure comprising:
   a shield electric wire having a braid covering a plurality of signal lines;
   an exterior member through which the shield electric wire is inserted;
   a grommet that is arranged at an opening of an attachment member, partitions one side and the other side of the attachment member from each other, and has an insertion portion through which the shield electric wire is inserted;
   an exposed portion, which is arranged between the insertion portion and the exterior member and where the braid is exposed to an outside; and
   resin that is provided at the exposed portion, is formed integrally with the exterior member and the insertion portion, and is poured to a space between the plurality of signal lines in the braid, a space between the braid and the plurality of signal lines, a space in the braid, a space between the braid and the exterior member, and a space between the braid and the insertion portion.

2. The water cut-off structure according to claim 1, wherein the exterior member is arranged on each of the one side and the other side of the attachment member, the exposed portion is arranged between the insertion portion and each of the exterior member on the one side and the other side, and the resin is provided at each of the exposed portions on one side and the other side.

* * * * *